Aug. 11, 1936.  V. F. BAUMGARDNER  2,050,518
HITCH MEANS
Filed May 6, 1935  2 Sheets-Sheet 1
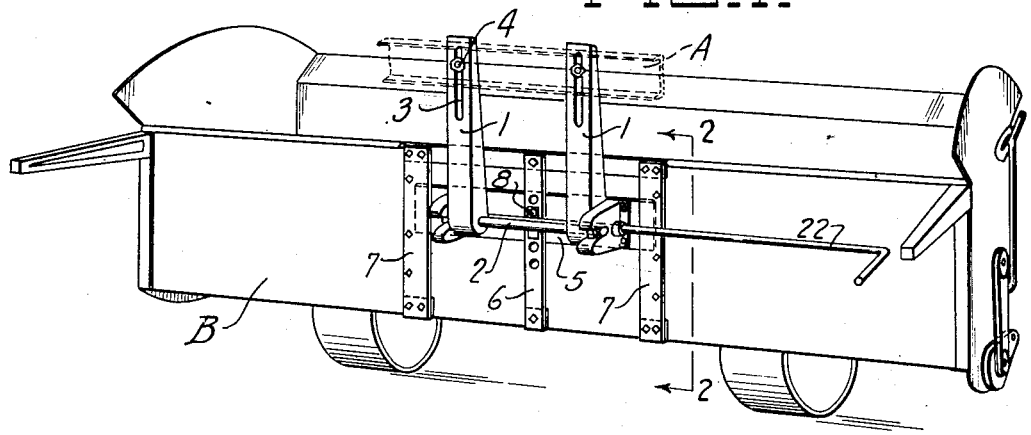
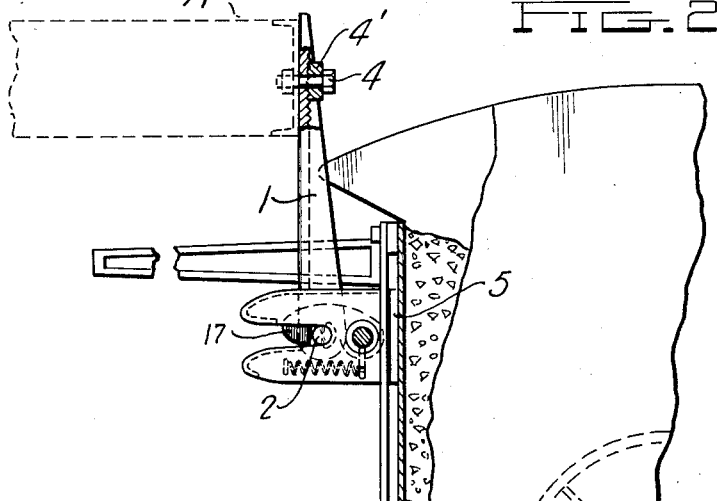
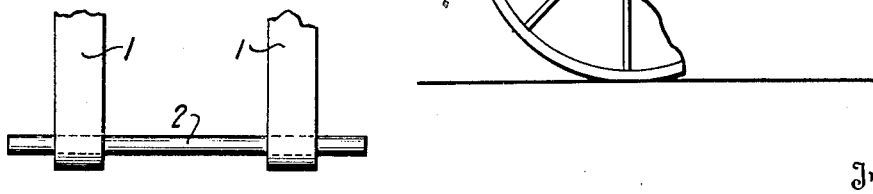
Inventor
Versal Forrest Baumgardner,
By Owen D Owen,
Attorneys.

Aug. 11, 1936.  V. F. BAUMGARDNER  2,050,518
HITCH MEANS
Filed May 6, 1935  2 Sheets-Sheet 2
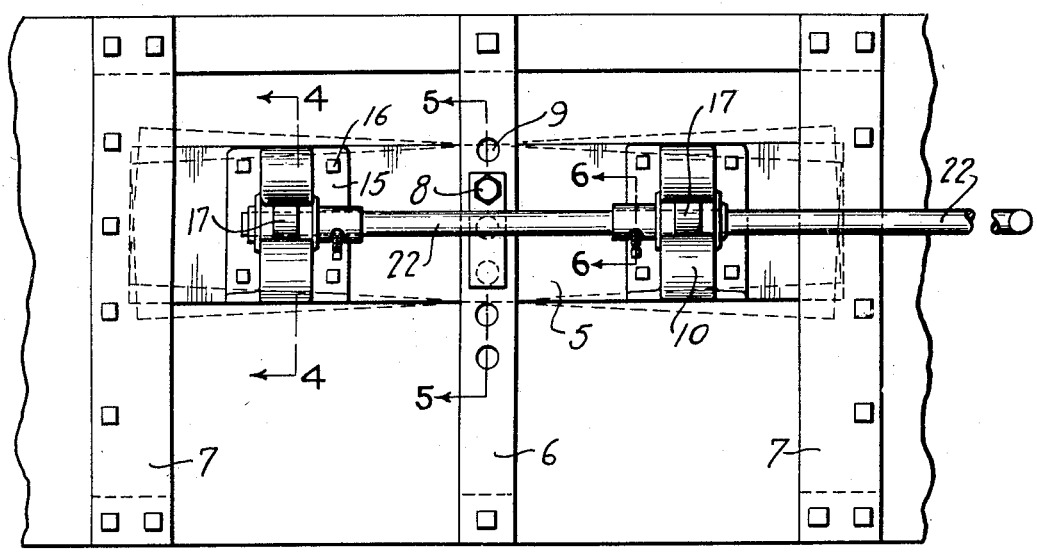
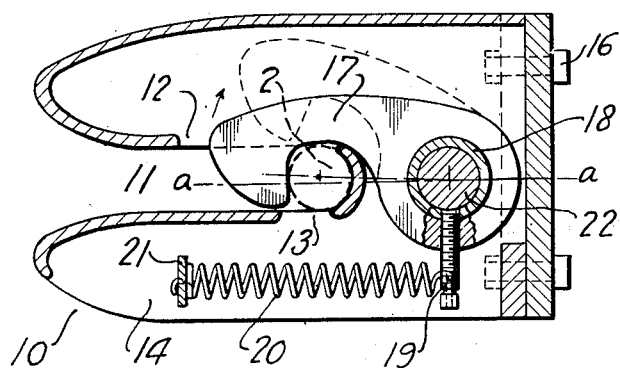
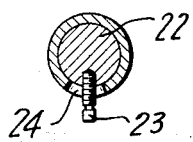
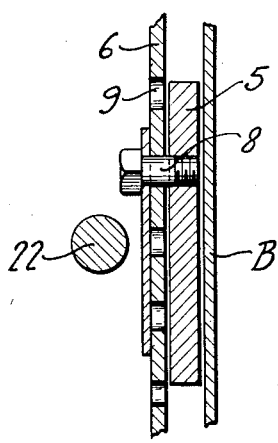
Inventor
Versal Forrest Baumgardner,
By Owen & Owen,
Attorneys Patented Aug. 11, 1936

2,050,518

UNITED STATES PATENT OFFICE 2,050,518

HITCH MEANS

Versal Forrest Baumgardner, Celina, Ohio

Application May 6, 1935, Serial No. 19,949

5 Claims. (Cl. 280—33.44)

This invention relates to hitch means for releasably connecting attachments, for instance a spreading machine, to vehicles, and has primarily for its object the provision of a means of this character of simple, strong and efficient construction and adapted to permit an easy and rapid connection of a machine to or its detachment from a truck, tractor, or other vehicle.

A further object of the invention is the provision of a novel form of hitch of the character described, which is capable of being used as a means for pushing or pulling the attached machine and of permitting free relative rocking movements thereof as they respectively travel over uneven surfaces.

Other objects and advantages of the invention will be apparent from the following detailed description of the invention, one embodiment of which is illustrated in the accompany drawings, in which—

Figure 1 is a perspective elevation of an attachment embodying the invention operatively connected to a spreading machine; Fig. 2 is an enlarged fragmentary section on the line 2—2 in Fig. 1 with parts broken away; Fig. 2ª is a fragmentary side elevation of the portion of the hitch means carried by the truck frame; Fig. 3 is an enlarged side elevation thereof with parts broken away; Fig. 4 is an enlarged section on the line 4—4 in Fig. 3; Fig. 5 is an enlarged section on the line 5—5 in Fig. 3, and Fig. 6 is an enlarged section on the line 6—6 in Fig. 3.

Referring to the drawings, A designates, in dotted lines, a truck frame, or the like, and B a machine attached thereto and adapted, in the present instance, for spreading a road surfacing material.

The hitch means comprising the illustrated embodiment of the invention includes two vertically disposed arms 1 fixedly attached to and depending from an end cross member of the truck frame A in horizontally spaced position and connected at their free ends by a cross-bar 2, the ends of which project beyond the respective arms to form trunnions. These arms, in the present instance, are of channel form with their flanges tapering in depth from their inner ends outwardly. The web of each arm is provided at its inner end with a longitudinal slot 3 for receiving a clamping bolt 4 for adjustably attaching the arm to the frame A and preferably having a clamping member 4' in serrated or ribbed engagement with the arm web, as shown in Fig. 2.

Attached to the side of the machine B, which is to be attached to the truck, is a cross member 5, in the present instance of elongated flat plate form, said member being pivoted to an upright 6 disposed centrally of the ends of the machine and attached at its upper and lower ends thereto with its intermediate portion spaced therefrom. The member 5 is disposed in the space between the upright 6 and machine B to have free rocking movements therein and the ends of the member are engaged back of respective uprights 7 attached to the machine at opposite sides of the upright 6 and form guides for the rocking movements of the ends of said cross member. It is apparent that a pull on the member 5 will be resisted relative to the machine B by the uprights 6 and 7, and that a pushing pressure against said member is resisted by the adjacent side of the machine against which the member rests. The cross member 5 is pivotally supported by a screw 8 and such screw may be placed in any one of a vertical series of holes 9 in the upright 6 to suit the desired vertical height of the member 2, as best shown in Figs. 3 and 5.

Fixedly attached to the cross member 5 and projecting outwardly therefrom away from the machine B at each side of the upright 6 is a forked member 10 adapted to receive in its fork a respective end trunnion of the cross-bar 2 on the truck A. For this purpose, the members 10 are suitably spaced on the cross member 5 to enable the pair of arms 1, 1 to project therebetween, as shown in Fig. 1. The slot 11 of the receiving member 10 is horizontally disposed and has its lips flared outward to provide a broadened mouth portion and to facilitate entrance of the cross-bar 5 therein. Each receiving member 10 is hollow and is provided in the upper wall of the slot 11 outwardly from near its inner end with an elongated opening 12 and in the inner end portion of its lower wall with an opening 13. The bottom of the member is also open, as shown at 14. The inner end of each receiving member is provided with an outwardly disposed flange 15, which abuts against the cross member 5 and is secured thereto by bolts 16.

A hook form of pawl 17 is removably disposed within the hollow of each member 10, being pivoted at the rear of the inner end of the slot 11 and having its shank extending over the inner end wall of said slot and its hooked nose portion adapted to project downwardly through the opening 12 into said slot to engage the outer side of a cross-bar 2 therein, as shown in Fig. 4. The pivotal axis of the pawl is preferably disposed below the axial center of the bar 2, so that an outward pull exerted by the bar on the hooked end of the pawl will tend to swing the pawl downward rather than to permit it to swing upward to release the bar.

Each pawl is carried by a respective sleeve 18 projecting through and journaled at its ends in openings (not shown) in the side walls of the member 10, and a screw or pin 19 projects downwardly from the inner end portion of each pawl and serves to fixedly connect the pawl and sleeve together. A coiled compression spring 20 is disposed lengthwise within the bottom hollow portion of each member 10 and has its opposite ends thrust against a cross-piece 21 within the member and a screw 19, so that it exerts a turning pressure on the associated sleeve 18 and pawl 17 to retain the latter in its lowered or normal engaging position shown in full lines in Fig. 4. A control shaft 22 for the pawls 17 projects through and is journaled in each of the sleeves 18 and has a screw 23 projecting therefrom through a respective transverse slot 24 in each sleeve 18, as best shown in Fig. 6.

This pin and slot connection of the shaft with the sleeves 18 enables either pawl to have an opening or upward movement relative to the shaft when a hitch bar 2 has contact with the tapered nose of the pawl and is being moved rearward into the receiving member, and also permits a positive raising movement of the pawls to be effected through a rocking movement of the shaft from its normal position. The normal position of the shaft 2 is with the handle at the end thereof projecting outward from the machine B, as shown in Fig. 1.

In the use of my hitch means, either the male member 2 or the female members 10 thereof, or both, may be vertically adjusted relative to their respective supports to suit the hitch means to the height of the machine B relative to the truck frame A. In effecting an engagement of the hitch members 2 and 5, either may be moved with respect to the other, so as to place the arms 1, in the present instance, intermediate the receiving members 10 and cause the trunnions or projecting end portions of the male member 2 to enter the slot 11 in the members 10. As the tapered nose portions of the pawls 17 are engaged by the member 2, they are raised against the tension of the springs 20 to permit the bar to pass to the rear of their hooked ends after which the pawls return to their normal positions and effectively connect the members, so that a pull or push applied to either member will be communicated to the other. A release of the pawls from engagement with the member 2 is effected by a rocking of the control shaft 22 by a raising of its handle portion. Any pull imparted to the members 10 is communicated to the cross plate or member 5 and this, in turn, acts against the uprights 6 and 7 to communicate a pulling force on the machine B. It is thus apparent that such pull is distributed over a considerable area of the adjacent side of the machine B depending on the length of the cross member 5 and the spacing of the uprights 6 and 7. It is also apparent, due to the pivotal connection of the member 5 with the center upright 6 and the sliding engagement of its end portions with the upright 7 that the member is free to rock relative to the machine B, so that no twisting strain is exerted on the crossbar 2 by relative vertical rocking movements of the truck frame A and machine B occasioned by irregular surfaces over which they may be passing.

The provision of the hole 13 in the bottom wall of the slot 11 in each receiving member enables sand, gravel, crushed stone, or other foreign matter which may enter the slot, to pass therefrom through such opening rather than accumulating therein, and thus interfering with an engaging movement of either the bar 2 or pawl 17.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. In a hitch device, a series of uprights, means to attach the uprights to an apparatus to be towed, said uprights being disposed in horizontal spaced relation to each other and also in spaced relation to such apparatus, an elongated horizontal member disposed in the space between the uprights and said apparatus and pivoted centrally of its ends to an intermediate one of the uprights, and having each of its ends disposed opposite to other of the uprights, a horizontal bar, means for connection to the towing vehicle and having connection with the bar to support the latter, and releasable means carried by the elongated member for coupling the latter to the bar.

2. In a hitch device, a horizontal member, means to support said member from an apparatus to be towed, means to pivotally connect said member to the supporting means intermediate the ends of the member, said supporting means being disposed spaced from the towed apparatus and the member being disposed in such space and the supporting means having portions which lie adjacent to the end portions of the member in front of the latter, a horizontal bar, means to support said bar from the towing vehicle, and releasable means carried by said member to engage the bar for coupling the member and bar.

3. In a hitch device, a horizontal member, means to support said member from an apparatus to be towed, means to pivotally connect said member to the supporting means intermediate the ends of the member, said supporting means being disposed spaced from the towed apparatus and the member being disposed in such space and the supporting means having portions which lie adjacent to the end portions of the member in front of the latter, connecting means, means to attach said connecting means to the towing vehicle, and releasable means for coupling the member to said connecting means of the towing vehicle.

4. In a hitch device, a series of three uprights, means to attach the uprights to an apparatus to be towed, said uprights being disposed in horizontal spaced relation to each other and also in spaced relation to such apparatus, an elongated horizontal member disposed in the space between the uprights and said apparatus and pivoted centrally of its ends to an intermediate one of the uprights and having each of its ends respectively disposed opposite to the other two uprights, a horizontal bar, means for supporting said bar from the towing vehicle in front of the uprights, and means for coupling the member to the bar.

5. In a hitch device, a horizontal member disposed substantially parallel to the rear end of an apparatus to be towed, means to mount the member intermediate its ends for pivotal movement so that each of the ends of the member can swing vertically, both in an upward and downward direction, means disposed in front of the member and having portions disposed adjacent the end portions of the member to guide the latter in its pivotal movements and to assume pulling strain imposed upon the member, means to support said guiding and strain-assuming means from said apparatus, and releasable means to couple the member to a towing vehicle.

VERSAL FORREST BAUMGARDNER.